(12) United States Patent
Thurailingam et al.

(10) Patent No.: US 11,945,256 B2
(45) Date of Patent: Apr. 2, 2024

(54) LASER MARKED OPTICALLY VARIABLE DEVICE

(71) Applicant: Canadian Bank Note Company, Limited, Ottawa (CA)

(72) Inventors: Thivaharan Thurailingam, Stittsville (CA); Silviu Crisan, Gatineau (CA)

(73) Assignee: CANADIAN BANK NOTE COMPANY, LIMITED, Ottawa (CA)

( * ) Notice: Subject to any disclaimer, the term of this patent is extended or adjusted under 35 U.S.C. 154(b) by 0 days.

(21) Appl. No.: 17/482,522

(22) Filed: Sep. 23, 2021

(65) Prior Publication Data

US 2022/0088958 A1 Mar. 24, 2022

(30) Foreign Application Priority Data

Sep. 24, 2020 (CA) .................... CA 3094381

(51) Int. Cl.
| | |
|---|---|
| *G02B 5/18* | (2006.01) |
| *B42D 25/29* | (2014.01) |
| *B42D 25/342* | (2014.01) |
| *B42D 25/351* | (2014.01) |
| *B42D 25/435* | (2014.01) |

(52) U.S. Cl.
CPC ........... *B42D 25/435* (2014.10); *B42D 25/29* (2014.10); *B42D 25/342* (2014.10); *B42D 25/351* (2014.10); *G02B 5/1852* (2013.01)

(58) Field of Classification Search
CPC .... B42D 25/435; B42D 25/29; B42D 25/342; B42D 25/351; B42D 25/328; B42D 25/41; B41M 3/14

USPC ........ 283/67, 70, 72, 74, 85, 86, 91, 94, 98, 283/901
See application file for complete search history.

(56) References Cited

U.S. PATENT DOCUMENTS

| | | | |
|---|---|---|---|
| 5,944,356 A | 8/1999 | Bergmann et al. | |
| 2021/0331505 A1* | 10/2021 | Thurailingam | B42D 25/342 |

FOREIGN PATENT DOCUMENTS

| | | | | |
|---|---|---|---|---|
| CA | 3016788 A1 * | 3/2020 | .............. | B41M 3/14 |
| DE | 4243987 A1 | 12/1992 | | |
| FR | 2893438 A1 | 5/2007 | | |
| WO | 03055684 A2 | 7/2003 | | |
| WO | 2003055684 A3 | 7/2003 | | |
| WO | 2005029654 A2 | 3/2005 | | |
| WO | 2005029654 A3 | 3/2005 | | |
| WO | 2011007344 A1 | 1/2011 | | |
| WO | 2015106352 A1 | 7/2015 | | |

(Continued)

*Primary Examiner* — Justin V Lewis
(74) *Attorney, Agent, or Firm* — Olson & Cepuritis, Ltd.

(57) ABSTRACT

A security device for security documents provides an angle-dependent Moiré effect. A security device for a security document and method for making the security device are provided. At least two interlaced laser engraved images form an angle dependent parallax effect. First and second images are laser engraved at a substrate of the security document. To render the security device more difficult to copy, a colour changing effect or a nonreciprocal transmission effect may be achieved by adding a coloured (absorptive or emissive) layer between or within non-laser engravable layers situated between the laser engravable layers, and/or by adding a patterned phase diffraction grating situated between the laser engravable layers.

16 Claims, 6 Drawing Sheets

(56) References Cited

FOREIGN PATENT DOCUMENTS

| WO | 2019077316 | A1 | 4/2019 |
| WO | 2020047650 | A1 | 3/2020 |

\* cited by examiner

LASER MARKED OPTICALLY VARIABLE DEVICE

CROSS-REFERENCE TO RELATED APPLICATIONS

This application claims the benefit of Canadian Patent Application No. 3,094,381 filed on Sep. 24, 2020, which is incorporated herein by reference in its entirety.

FIELD

The invention relates generally to security documents such as identification documents and particularly to a security device for security documents, the security device comprising interlaced images producing an angle-dependent Moiré effect with an additional colour functional layer.

BACKGROUND

Counterfeits in security documents are quite prevalent due to the demand of fake ID for various purposes including underage drinking, access to festivals with age restriction, and illegal activities such as financial frauds and unauthorized travels.

The recent advancement in digital printing technologies poses a challenge. The resolution of off-the-shelf inkjet and dye sub printers, availability of papers and polymers that accept high-quality print, and access to all the materials and knowledge through smart phones make counterfeiters' work more efficient. This advancement in printing technologies and communication produces a challenging situation for security printers.

To fight counterfeiters, it is useful to include security features that can be identified without the use of an aid, such as a hologram, kinegram, optically variable ink, etc. Unfortunately, low grade holograms and optically variable ink can be purchased online, to which counterfeiters have easy access. To fight the modern counterfeiters, it is important to produce security features that can only be produced through the manufacturing process that is used for card production. This may not be a fool-proof method, but it will serve as a challenge for counterfeiters.

EP0353974A2 discloses the use of a parallax effect (angle dependent Moiré phenomenon) to obtain an optical system on a transparent/translucent film. The metallic image lines and screen (grid) interleaved lines are applied by chemical deposition, vacuum deposition, by printing with metallic ink or by chemical or laser demetallization. The feature will be costly due to metallization and the need for registration between two images. Personalization is difficult to achieve with this technique as the metallization is done in sheet/web form.

U.S. Pat. No. 6,494,491B1 discloses a similar optical effect obtained using the printing of at least two image patterns at a separated distance from each other by means of a transparent layer of material. The feature changes from light to dark due to Moiré effect raised by the overlapping patterns. The overlapping patterns are printed simultaneously or on two different layers and laminated together. This technique would not allow for personalization of the feature.

In U.S. Pat. No. 4,766,026A, the parallax effect is obtained by laser engraving an image through a transparent layer. The polymer layers, which blacken at different intensity values, are used to achieve this feature. A disadvantage of this is that the synthetic material used will have different grey value due to varying laser sensitivity. A higher laser sensitivity means the darker the film. This will produce a card with different grey on either side. The cost of material with varying laser sensitivities is high and would add more cost to the security device.

SUMMARY

Disclosed herein is a security device for a security document comprising at least two interlaced laser engraved images forming an angle dependent parallax effect wherein each image is laser engraved at a substrate of the security document, the substrate comprising at least one non-laser-engravable layer within or between laser engravable layers.

The present invention makes use of an angle-dependent Moiré phenomenon to provide a security device for identification documents. Moiré patterns are made up of two-dimensional images that result from the interference of two overlapping patterns. In the present invention, the overlapping patterns are laser engraved on identification documents, which would allow for personalization. By displacing two immediately adjacent patterns by tilt, the Moiré interference pattern also changes, leading to the known, changing light-dark image effect.

Disclosed herein is an improvement to a laser engraved angle-dependent Moiré effect achieved by adding absorptive and/or emissive lines to at least one non-laser engravable layer between the two interleaved laser engraved layers. Two variations are disclosed:
1. Adding absorptive colour lines in registration with the laser engraved images on the face and back side of the card.
2. Adding emissive lines such as luminescent or fluorescent lines in registration with the laser engraved images on the face and back side of the card.

Also disclosed herein is an improvement to a laser engraved angle-dependent Moiré effect, namely a nonreciprocal transmission window, achieved by adding a patterned phase diffraction grating between the two laser engraved layers.

DETAILED DESCRIPTION

Figure 1:
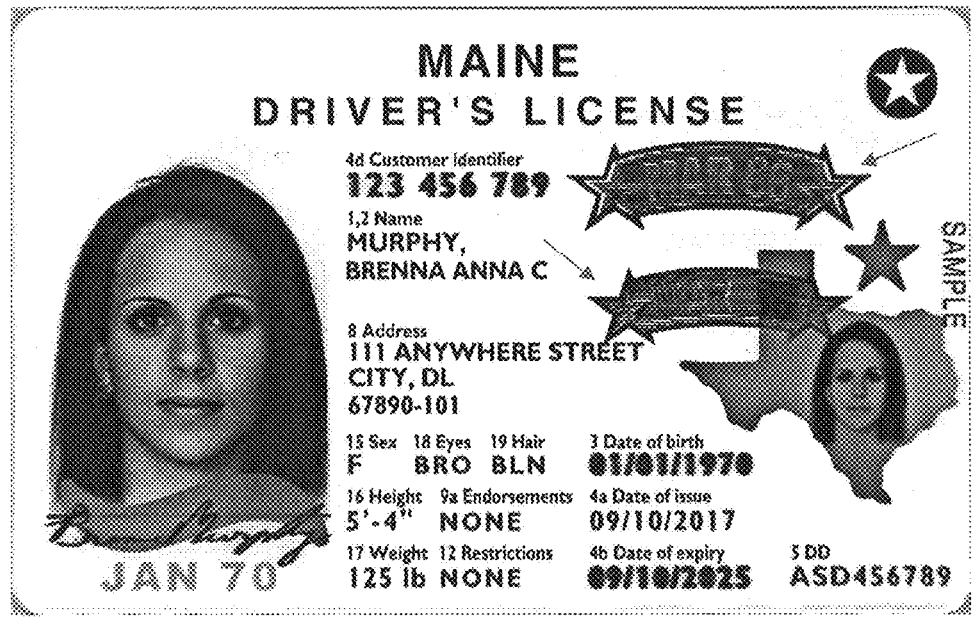
FIG. 1 illustrates a security document card construction for obtaining laser engraved Moiré effect.

The optically variable devices disclosed herein make use of an angle dependent Moiré phenomenon to obtain a security feature for security documents. Moiré patterns are made up of two-dimensional images that result from the interference of two overlapping patterns. By displacing two immediately adjacent patterns by tilt, the Moiré interference pattern also changes, leading to a changing light-dark image effect. As disclosed herein, the overlapping patterns are laser engraved on the security documents, and a further functional layer is included between the laser engraved layers.

As disclosed herein, no layering of metals with high optical density is necessary in order to create the Moiré interference pattern. Since the laser engraving is the last process, personalization is possible.

Further as disclosed herein, laser receptive film (or laser engravable layers) with at least one non-laser receptive film (non-laser engravable layer) in the middle or in between is used to achieve the result. The at least one non-laser receptive film will displace the adjacent pattern to its thickness and allows for the angle-dependent Moiré effect.

As used herein, the term "absorptive" refers to the property of pigments and dyes to selectively absorb certain wavelengths from the visible spectrum while reflecting others from the same spectrum. Absorptive colour in a security feature appears under normal illumination.

As used herein, the term "emissive" refers to the property of pigments and dyes to respond by emitting a fluorescent or phosphorescent light in the visible spectrum when exposed to UV illumination. Thus, emissive colour in a security feature appears under UV illumination.

To make the security feature more difficult to copy, an additional element may be added to the at least one non-laser engravable film or layer situated between the laser engravable layers.

In an embodiment, an absorptive/passive colour layer (pigments/dyes) or emissive/active colour layer (luminescence effect) may be added between the two laser engraved layers to provide a colour changing effect instead of light-dark image effect.

In an embodiment, the additional element may consist in a patterned phase diffraction grating. The diffraction grating may be transparent under incoherent illumination in the visible spectrum. In this case the effect it is no longer solely a Moiré phenomenon—the incoming partially coherent light is steered by diffraction on the phase grating regions and it may be designed to create a colour, non-reciprocal image when the window is viewed face-up versus bottom-up. This embodiment of the invention relies on the asymmetric positioning of the diffraction grating layer between the two laser marked Moiré screens, i.e. as close as possible to the top one and as far as possible from the bottom one. Such a configuration allows, in the situation of the top illumination—bottom observation, the necessary optical path for the diffracted beam to deflect and outcouple through the openings of the bottom Moiré screen that are darkened at that particular angle of observation. The result is an angular variable colour image superposed over the black and white Moiré pattern. In the reverse illumination-observation configuration this diffraction image will disappear, only the reciprocal Moiré pattern remaining visible.

In FIG. 1, the card construction for laser engraved Moiré effect is shown. In this embodiment, a 205 μm non-laser engravable layer is used between the laser engravable layers to achieve the effect. In an embodiment, the laser engravable layers and non-laser engravable layers may be polycarbonate (for example, laser engravable and non-laser engravable forms of polycarbonate are available from Covestro). Other laser engravable (LE) and non-laser engravable (NLE) materials are possible as well, such as PET and PVC. The thickness of the NLE layer can be between 50 to 400 μm, preferably between 150 to 300 μm.

The angle dependent Moiré effect (parallax) may be partially or entirely in a transparent region of the card. The transparent region of the card is produced by leaving a knockout on the white (opaque) layer. During lamination, the clear layer will fuse into the knockout region and form a transparent window region where the parallax feature will be laser engraved.

To achieve the parallax feature, the card construction is very important. The construction must have a laser engravable layer on each side of the card and at least one non-laser engravable layer in the middle. This at least one non-laser engravable layer would allow for a series of laser engraved lines at a distance. The separation allows for angle dependent Moiré effect.

Figure 2:
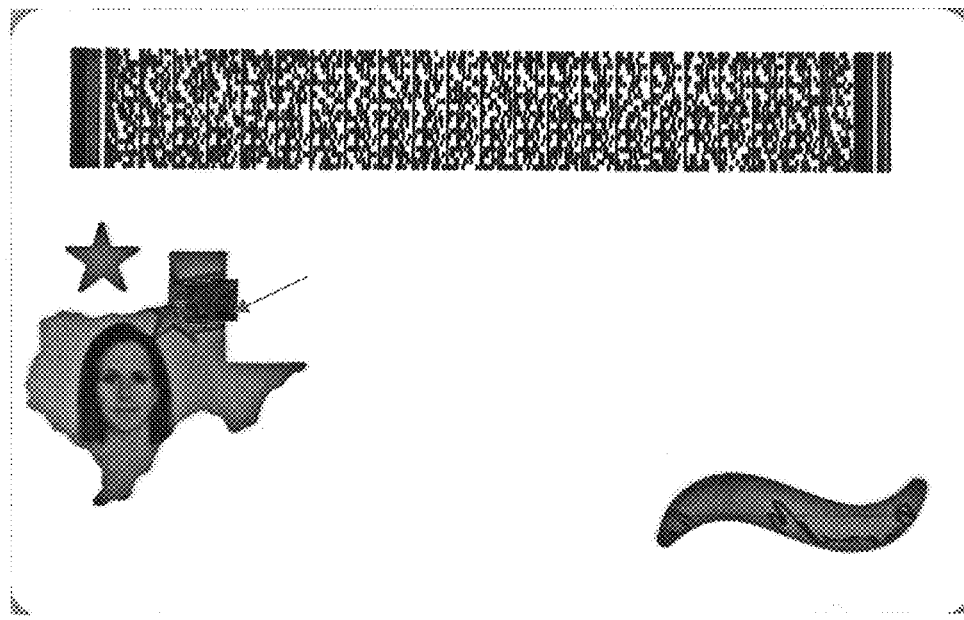
FIG. 2 illustrates two images used to obtain laser engraved Moiré effect in a transparent region of a security document.

To achieve the Moiré effect, two interlaced images (image a1 and a2 as shown in FIG. 2) must be laser engraved; one at the face side of the document and other at the back side; at least partially over the transparent region. The image a1, shown in FIG. 2, is called the grid line. On a laser engraved window, these lines create a path for light to transmit though. The image line "image a2", which carries the data, allows or blocks the light travels though the "image a1" depends on the phase shift. The image a2 shows one data (JAN 70) embedded within. Additional data may be added. Image a1 is called a screen image with a series of parallel lines. Image a2 contains a series of parallel lines, which carries phase shifted lines with personal data.

Figure 3:
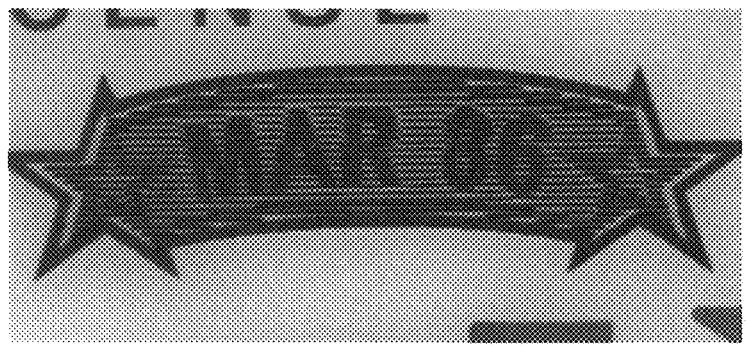
FIG. 3 illustrates a security document card construction and the laser engraving specification of the Moiré effect in a transparent region of the card.

Both images discussed in FIG. 2 are laser engraved on the card. As discussed, the "image a1" gets laser engraved on side one and "image 2" laser engraved on side 2. During laser engraving, the density of the laser beam will be high at the surface (first side) of the card leading to darker marking. As the laser beam travels down the card, the density will be dropped due to absorption, and the marking intensity will decrease. This leads to lighter laser engraving further down in the card at the second side (shown in faded line in FIG. 3). A similar process happens during laser engraving of the second image (image a2) at the second side of the card. During engraving, the non-laser engravable layer will not be affected. The darker image of "image a1" at the first side and darker image of "image a2" at the second side will be separated by the thickness of the at least one non-laser engravable layer as shown in FIG. 3. This separation allows for angle-dependent Moiré effect and leads to the light-dark image effect.

It is possible to create an angle dependent Moiré effect that overlaps transparent and opaque regions of the card. Having a middle colour/absorptive (passive) and/or emissive (active) layer would enhance the feature and make it difficult to counterfeit. To add a colour and/or emissive layer to the angle dependent Moiré effect, a printed layer must be inserted between the two sets of laser engraved lines. The print has to be in series of lines and has to match the frequency of the laser engraved lines (i.e. the lines must be in tight registration with the laser engraved lines). Lithography, flexography, gravure, Intaglio, Silkscreen, inkjet, digital press, and toner printing can be used to achieve this.

Figure 4:
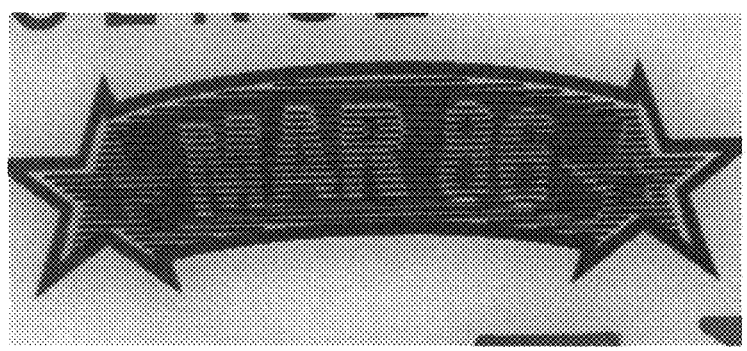
FIG. 4 illustrates a security document card construction for obtaining a laser engraved Moiré effect with a colour changing effect.

FIG. 4 shows a way of inserting an absorptive/emissive layer within a document. As shown in FIG. 1, the construction of the card has a 205 µm non-laser engravable layer in the middle (although anywhere from 50-400 µm is possible). To insert the absorptive/emissive layer, it is possible to use two thinner non-laser engravable layers, for example one 100 µm thick and one 125 µm thick, with the absorptive or emissive colour layer applied to one of the non-laser engravable layers and being situated between or within the non-laser engravable layer(s). As illustrated in FIG. 4, the absorptive and/or emissive print lines are located at the bottom of the 125 µm NLE layer.

Figure 5:
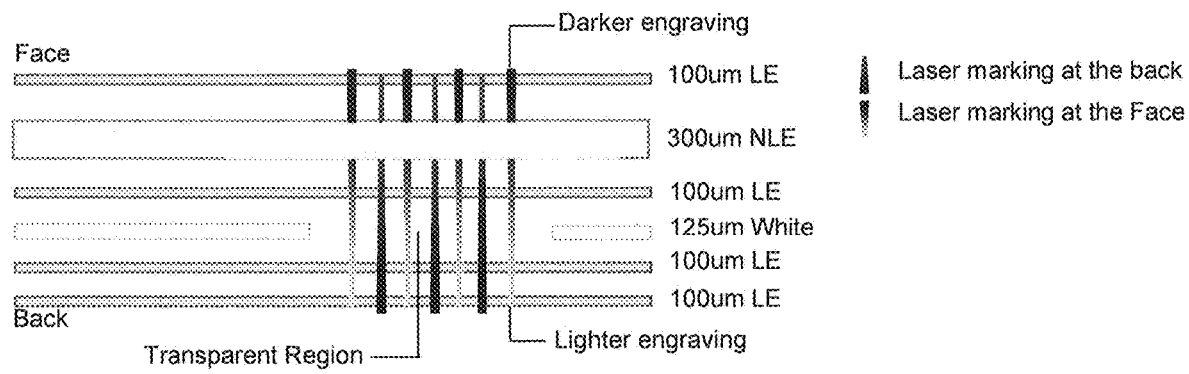
FIG. 5 illustrates a security document card construction, the laser engraved Moiré effect in a transparent region of the card, with absorptive and/or emissive lines for the creation of a colour changing effect.

FIG. 5 illustrates a document with laser engraved Moiré effect in the transparent-window region. The absorptive and/or emissive lines are placed between the non-laser engravable layers. Emissive lines can be also used which may either be transparent or opaque. The emissive lines will be viewed using ultraviolet light and/or infrared light.

Figure 6:
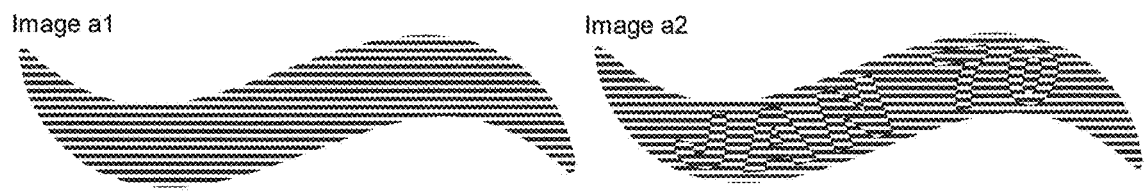
FIG. 6 illustrates a side view of a nonreciprocal transmission window in a security document card.
Figure 7:
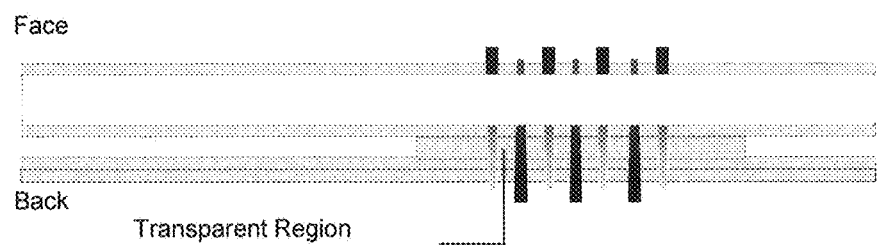
FIG. 7 illustrates a top view of a nonreciprocal transmission window in a security document card.

As illustrated in FIGS. 6 and 7, to achieve non-reciprocal transmission, a patterned phase diffraction grating layer may be inserted between the laser engravable layers. In this case the effect is no longer uniquely rooted on the Moiré effect, the incoming partially coherent light is steered by diffraction on the phase grating regions and it may be designed to create a colour, non-reciprocal image when the window is viewed from one side, such as face-up versus bottom-up.

In this embodiment, the Moiré pattern obtained by laser marking the top and the bottom laser engravable layers, combined with the patterned phase diffraction grating layer, creates the appearance of a colour image when the illumination is made from a first side, such as the top side of the card, and the viewing is made from a second side, such as the bottom side at or close to the normal incidence. This effect is due to the diffraction that steers part of the incoming light toward the apertures of the bottom layer that are otherwise masked at normal incidence—in Moiré terms, there is a lighted image superposed on a black Moiré fringe. In inverse viewing condition the diffraction appears but does not have sufficient optical space to develop and outcouple through the top apertures, and accordingly the Moiré fringe remains dark.

The apertures can be holes on the opaque layer or voids left during laser engraving (un-marked area) over the transparent window. The term "aperture" should be interpreted in the optical transparency sense and not strictly as a cut-out in the opaque layer.

The diffraction grating may be created by, for example, UV imprint lithography. It is a simple lithography process with low cost, high throughput and high resolution. It creates patterns by mechanical deformation of imprint resist or varnish and subsequent processes. The imprint resist is typically a monomer or polymer formulation that is cured by heat or UV light during the imprinting. Adhesion between the resist and the template is controlled to allow proper release.

Figure 8:
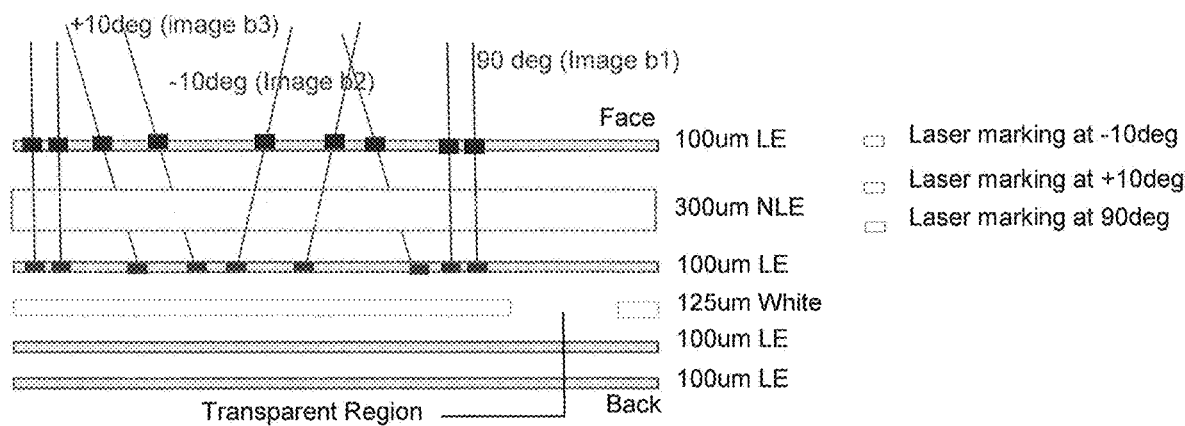
FIG. 8 illustrates a UV imprint lithography process for replicating small micro scale patterns.

FIG. 8 illustrates the steps in the process.

The polycarbonate insert is a carrier for the UV cured image. The UV cured image may then be incorporated into polycarbonate security documents that contain a transparent window feature, for example to be combined with or placed between laser engraved layers, as described herein.

Figure 9:
FIG. 9 illustrates a possible method for manufacturing a diffractive optical element.

FIG. 9 illustrates a method for production of a polycarbonate layer comprising the diffractive optical element in a transparent window, according to one embodiment.

Reels of polycarbonate can be mounted on commercially available equipment (i.e. Melzer lamination line) equipped with a punch mechanism that allows the polycarbonate opaque core material to be punched with a void area, then the transparent insert carrying the UV cured embossed diffractive optical element (DOE) is punched from a separate reel, and pressed into the void previously created in the core material.

A plug insert method used in manufacturing is expected to be very efficient.

Alternatively, a method may be used which also uses the same punch method (Melzer), but the inlay manufacturing machine (combo machine, parts from optically variable device (OVD) Kinegram, Melzer, and Durrer) incorporates a pick & place robot that affixes the "plug" carrying the DOE image onto a carrier sheet, in register with voids cut out (windows) in the opaque core sheet. The inlay is then collated with other sheets that make up the document construction, and laminated on a hot press laminator (Burkle), using heat and pressure over a period of time. A typical heat setting for the plates is in the 185-190° C. range. The pressure may vary from 20 to 240 bar, time may vary from 50 to 90 minutes, including startup heating time and cooling back to room temperature.

Figure 10:
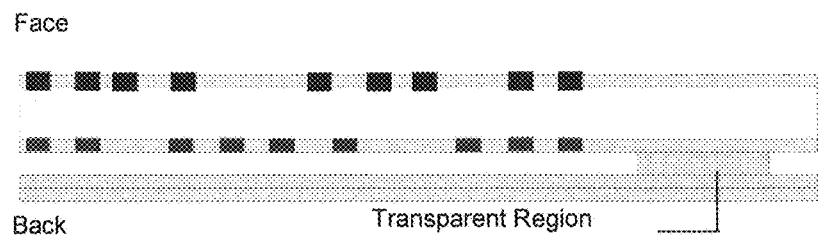
FIG. 10 illustrates an exemplary embodiment of a non-reciprocal transmission window in a polycarbonate data page.
Figure 11:
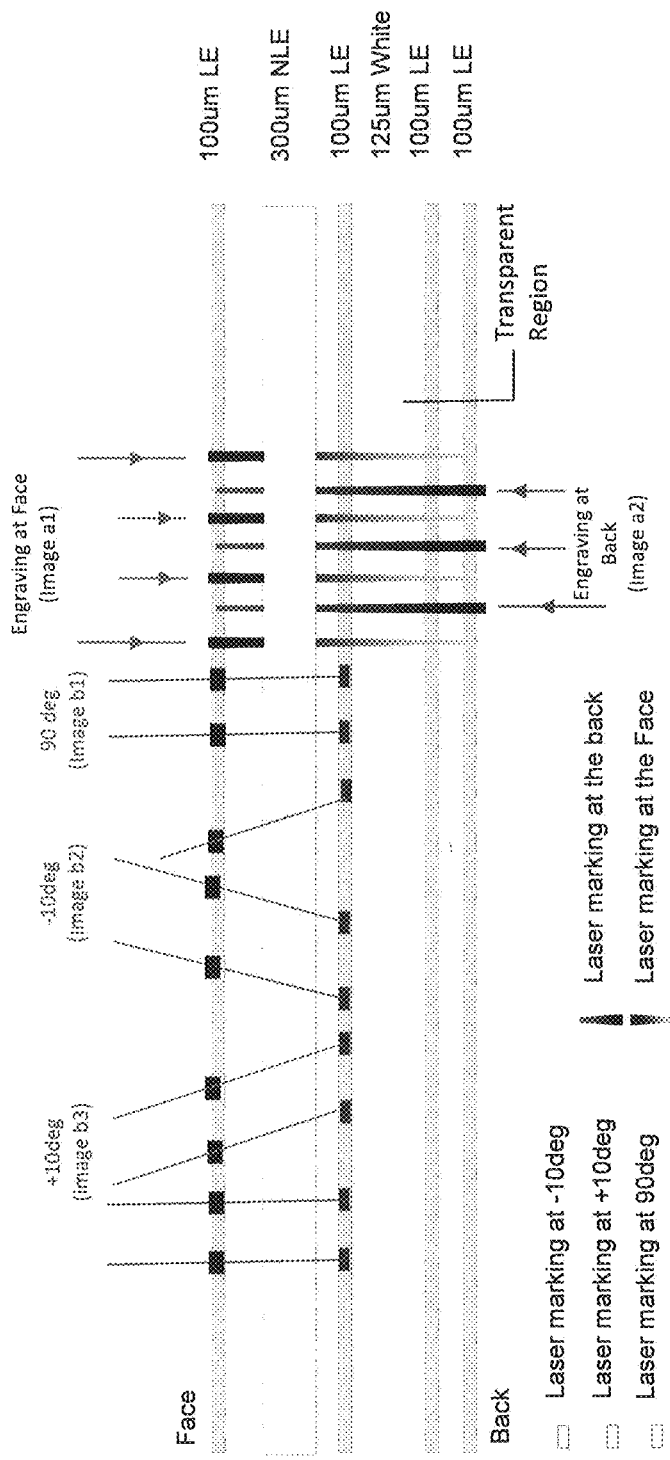
Figure 12:
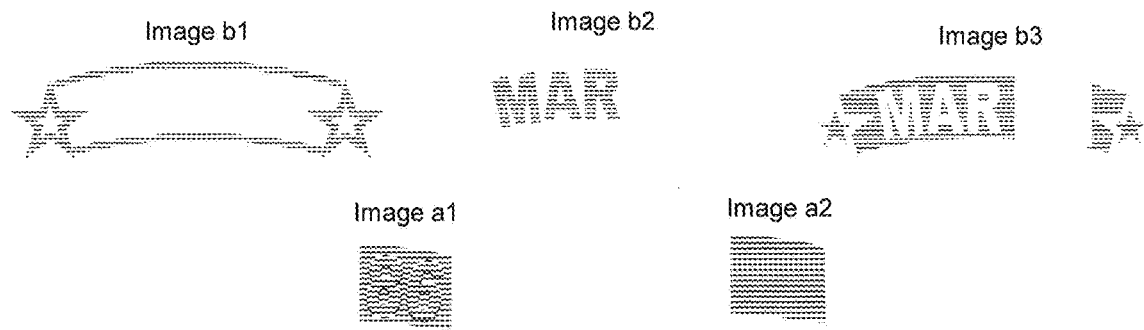
Figure 13:
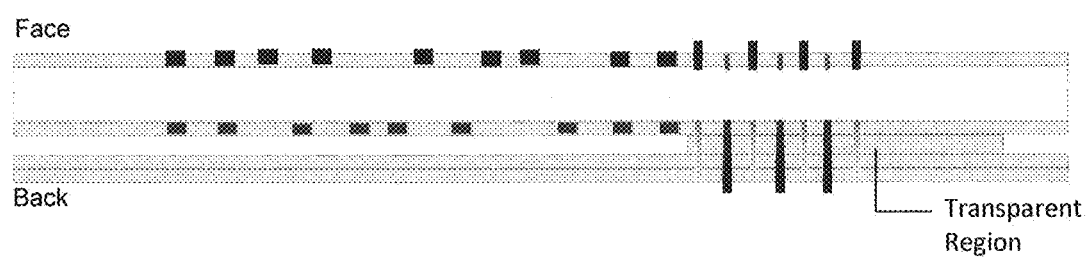
Figure 14:
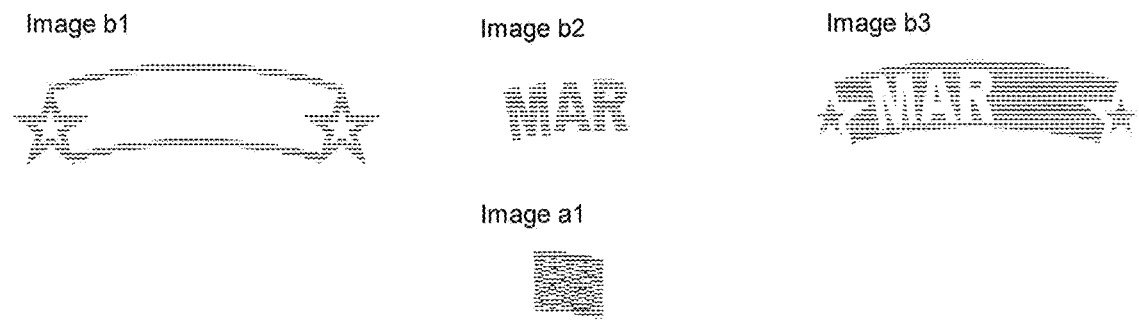

In an embodiment illustrated in FIG. 10, a cross-section of a non-reciprocal transmission window in a polycarbonate data page may comprise the following layers:

Legend: 1—opaque polycarbonate layer with perforated apertures, diameter of 50 µm
2—polycarbonate or compatible layer with phase diffraction layer
3—clear polycarbonate layer, optical open space role
4—aperture print on the bottom of the 3rd layer As discussed above, the non-reciprocal transmission window may be placed between laser engraved layers to create a colour, non-reciprocal image.

The previous detailed description has been provided for the purposes of illustration and description. Thus, although there have been described particular embodiments of the present invention, it is not intended that such references be construed as limitations upon the scope of this invention except as set forth in the following claims.

We claim:

1. A security device for a security document, the security device comprising:
   at least two interlaced laser engraved images forming an angle dependent parallax effect wherein first and second images are laser engraved at a surface of a substrate of the security document, and
   a colour image printed on at least one non-laser-engravable layer situated between laser engravable layers, wherein the colour image is in registration with the laser engraved images, whereby the combination of the colour image and the at least two interlaced laser engraved images results in a colour changing effect.

2. A security device as claimed in claim 1, wherein the first image is engraved on a front surface of the substrate and the second image is engraved on a back surface of the substrate.

3. A security device as claimed in claim 1, further comprising at least two non-laser engravable layers, wherein the colour image is situated between the at least two non-laser engravable layers.

4. A security device as claimed in claim 1, wherein the colour image is a passive colour image or an absorptive colour image.

5. A security device as claimed in claim 1, wherein the colour image is an active colour image or an emissive colour image.

6. A security document comprising a security device according to claim 1.

7. A security device for a security document, the security device comprising:
  at least two interlaced laser engraved images forming an angle dependent parallax effect wherein first and second images are laser engraved at a surface of a substrate of the security document, a diffraction grating between laser engravable layers, and at least one aperture on a front side of the substrate and at least one aperture on a back side of the substrate.

8. A security device as claimed in claim 7, wherein the first image is engraved on a front surface of the substrate and the second image is engraved on a back surface of the substrate.

9. A security device as claimed in claim 7, wherein the diffraction grating is situated closer to a first side of the substrate than to a second side of the substrate.

10. A security device as claimed in claim 7, wherein the at least one aperture is an optically transparent portion of the substrate.

11. A security device as claimed in claim 7, wherein the at least one aperture is a hole or gap in an outer layer of the substrate.

12. A security device as claimed in claim 7, wherein the diffraction grating is situated in a transparent window portion of a security document.

13. A security device for a security document, the security device comprising:
  at least two interlaced laser engraved images forming an angle dependent parallax effect wherein first image and second images are laser engraved on a substrate of the security document, and a colour image is printed on at least one non-laser-engravable layer situated between laser engravable layers, wherein the colour image is in registration with the laser engraved images, whereby the combination of the colour image and the at least two interlaced laser engraved images results in a colour changing effect.

14. A security document comprising a security device made by the method of claim 13.

15. A security device for a security document, the security device comprising:
  at least two interlaced laser engraved images forming an angle dependent parallax effect wherein first image and second images are laser engraved on a substrate of the security document, a diffraction grating between laser engravable layers, and at least one aperture is defined on a front side of the substrate and at least one aperture is defined on a back side of the substrate.

16. A security document comprising a security device made by the method of claim 15.

* * * * *